United States Patent
Park et al.

(10) Patent No.: US 11,885,889 B2
(45) Date of Patent: Jan. 30, 2024

(54) METHOD, PERFORMED BY GNSS RECEIVER, FOR PROCESSING DATA SIGNAL, AND RECORDING MEDIUM AND GNSS RECEIVER SYSTEM

(71) Applicant: PPSOLN, INC., Seoul (KR)

(72) Inventors: Kwan Dong Park, Seoul (KR); Woong Jun Yoon, Incheon (KR)

(73) Assignee: PPSOLN, INC., Seoul (KR)

( * ) Notice: Subject to any disclaimer, the term of this patent is extended or adjusted under 35 U.S.C. 154(b) by 311 days.

(21) Appl. No.: 17/311,847

(22) PCT Filed: Nov. 29, 2019

(86) PCT No.: PCT/KR2019/016705
§ 371 (c)(1),
(2) Date: Jun. 8, 2021

(87) PCT Pub. No.: WO2020/122480
PCT Pub. Date: Jun. 18, 2020

(65) Prior Publication Data
US 2022/0018970 A1      Jan. 20, 2022

(30) Foreign Application Priority Data
Dec. 14, 2018 (KR) .......... 10-2018-0162140

(51) Int. Cl.
*G01S 19/23* (2010.01)
*G01S 19/06* (2010.01)
*G01S 19/25* (2010.01)

(52) U.S. Cl.
CPC .............. *G01S 19/23* (2013.01); *G01S 19/06* (2013.01); *G01S 19/25* (2013.01)

(58) Field of Classification Search
CPC .......... G01S 19/40; G01S 19/23; G01S 19/06; G01S 19/42; G01S 19/25
See application file for complete search history.

(56) References Cited

U.S. PATENT DOCUMENTS

| | | | |
|---|---|---|---|
| 7,987,047 B2* | 7/2011 | Ishigami | G01S 19/49 701/478.5 |
| 8,749,432 B2* | 6/2014 | Watanabe | G01S 19/21 342/357.67 |

(Continued)

FOREIGN PATENT DOCUMENTS

| | | | | |
|---|---|---|---|---|
| CN | 108761497 A | * | 11/2018 | ............ G01S 19/20 |
| JP | 2006-162563 A | | 6/2006 | |

(Continued)

OTHER PUBLICATIONS

International Search Report and Written Opinion dated Mar. 9, 2020 in International Application No. PCT/KR2019/016705, in 9 pages. (English translation of ISR in 2 pages.).

(Continued)

*Primary Examiner* — Dung Hong
(74) *Attorney, Agent, or Firm* — Knobbe, Martens, Olson & Bear, LLP

(57) ABSTRACT

This application relates to a data signal processing method. In one aspect, the method includes receiving a data signal from at least one global navigation satellite system (GNSS) satellite and obtaining a pseudo-range of the at least one GNSS satellite by using the data signal. The method may also include obtaining a range-acceleration based on the pseudo-range. The method may further include applying, to the data signal, a variance obtained by assigning a weight according to a noise model to the range-acceleration.

9 Claims, 17 Drawing Sheets

(56) References Cited

U.S. PATENT DOCUMENTS

| | | | |
|---|---|---|---|
| 9,121,936 B2* | 9/2015 | Tominaga | G01S 19/40 |
| 9,322,919 B2* | 4/2016 | Iwasaki | G01S 19/08 |
| 9,417,327 B2* | 8/2016 | Yamada | G01S 19/22 |
| 10,247,831 B2* | 4/2019 | Sasaki | G01S 19/42 |
| 2004/0064222 A1* | 4/2004 | Laurichesse | G01S 19/40 |
| | | | 701/13 |
| 2010/0265133 A1 | 10/2010 | Kholostov et al. | |
| 2011/0090117 A1* | 4/2011 | Rodriguez | G01S 19/428 |
| | | | 342/357.61 |
| 2015/0346346 A1* | 12/2015 | Yoon | G01S 19/28 |
| | | | 342/357.65 |
| 2017/0276794 A1* | 9/2017 | Tollkühn | G01S 19/22 |

FOREIGN PATENT DOCUMENTS

| | | |
|---|---|---|
| JP | 2006-322846 A | 11/2006 |
| KR | 10-2002-0094736 A | 12/2002 |
| KR | 10-2018-0032300 A | 3/2018 |
| WO | 2006/132003 A1 | 12/2006 |
| WO | 2014/002210 A1 | 3/2014 |

OTHER PUBLICATIONS

Office Action dated May 24, 2022 in Japanese Application No. 2021-534301.

* cited by examiner

METHOD, PERFORMED BY GNSS RECEIVER, FOR PROCESSING DATA SIGNAL, AND RECORDING MEDIUM AND GNSS RECEIVER SYSTEM

The present application is a U.S. national phase application under 35 U.S.C. § 371 of International Application No. PCT/KR2019/016705, filed on Nov. 29, 2019, which claims the benefit of Korean Patent Application No. 10-2018-0162140 filed on Dec. 14, 2018, in the Korean Intellectual Property Office, the entire disclosure of each of which is incorporated herein by reference.

TECHNICAL FIELD

Embodiments of the present disclosure relate to a data signal processing method of a global navigation satellite system (GNSS) receiver, a recording medium, and a GNSS receiver.

BACKGROUND ART

A global navigation satellite system (GNSS) is a system that provides information about a position and velocity of an object on the ground by using a satellite orbiting space. The GNSS is able to identify precise position information with a resolution equal to or less than 1 m at a minimum, and is widely applied not only for military purposes, but also in private sectors, such as position guidance of transportation means, such as aircrafts, ships, and vehicles, geodetic surveys, emergency rescues, and communication. Existing GNSSs include a global positioning system (GPS) developed and operated by the U.S. Department of Defense, a global navigation satellite system (GLONASS) of Russia, Galileo of the European Union (EU), and Beidou of China.

The GNSS includes at least one satellite, a receiver for receiving a signal, a ground monitoring station, and a system monitoring system. Here, a position of the receiver is determined as the receiver receives radio waves transmitted from the satellite and calculates a distance from the satellite.

However, in an urban environment where buildings are concentrated, an error may occur by at least several hundred meters due to a multipath error and signal blocking, and thus the multipath error is regarded as a serious limitation of the GNSS. The multipath error is one of the major errors in GNSS positioning, and occurs when a satellite signal is reflected by a terrain or building around the receiver. The multipath error occurs a lot in an urban area where buildings are concentrated and a low elevation satellite signal, and unlike ionospheric and tropospheric delays, the multipath error is not erased even via relative positioning and is difficult to be predicted, and thus studies for reducing an influence of the multipath error are being actively conducted. Recently, attempts have been made to reduce the multipath error by using, as weights, a signal-to-noise ratio (SNR) and an elevation angle. Li and Wu (2009) proposed a weighted model for reducing a multipath error in an urban environment by modeling an SNR in a form of an exponential function by using a characteristic that the SNR is reduced when a GNSS signal is reflected on a building. Tay and Marais (2013) proposed a weighted model that uses both an elevation angle and an SNR together by using a characteristic that a satellite with a low elevation angle is relatively affected more by a building. Although an exponential function model of the SNR and an elevation angle-SNR combination model are effective, such models still show a limitation that a positioning error equal to or greater than 10 meters occurs in an urban environment.

DESCRIPTION OF EMBODIMENTS

Technical Problem

The present disclosure is in accordance with the above-described necessity, and a problem to be solved by the present disclosure is to provide a method and system for reducing a multipath error by using a changing characteristic of a code pseudo-range observation value so as to secure stable global navigation satellite system (GNSS) positioning accuracy in an urban environment.

More specifically, the present disclosure provides a method and system using, as a weight, an acceleration of a code pseudo-range observation value generated by a receiver so as to reduce a multipath error.

Solution to Problem

According to an embodiment of the present disclosure, a data signal processing method of a receiver system for reducing a multipath error of a data signal received from a satellite, includes: receiving a data signal from at least one satellite and obtaining a pseudo-range of the at least one satellite using the data signal; obtaining a range-acceleration based on the pseudo-range; and applying, to the data signal, a variance obtained by assigning a weight according to a noise model to the range-acceleration.

The obtaining of the range-acceleration may include obtaining, as the range-acceleration, a second time derivative obtained by performing a differentiation on the pseudo-range with respect to time.

The noise model may be at least one of a linear model, a polynomial model, and an exponential model.

The data signal processing method may further include evaluating accuracy based on the data signal to which the weight according to the noise model is applied.

A recording medium according to an embodiment of the present disclosure may be a computer-readable recording medium where a program of instructions executable by a computer is tangibly embodied to perform a data signal processing method for reducing a multipath error of a data signal received from a satellite.

According to an embodiment of the present disclosure, a receiver system for reducing a multipath error of a data signal received from a satellite, includes: a data receiver for receiving a data signal from at least one satellite; a pseudo-range obtainer for obtaining a pseudo-range of the at least one satellite by using the data signal; a weight generator for obtaining a range-acceleration based on the pseudo-range and generating a weight according to a noise model by using the range-acceleration; and a data processor for applying, to the data signal, a variance obtained by assigning the weight to the range-acceleration.

The weight generator may obtain, as the range-acceleration, a second time derivative obtained by performing a differentiation on the pseudo-range with respect to time.

The noise model may be at least one of a linear model, a polynomial model, and an exponential model.

The receiver system may further include an accuracy evaluator for evaluating accuracy based on the data signal to which the weight according to the noise model is applied.

Other aspects, features, and advantages other than those described above will become apparent from the following drawings, claims, and description of the disclosure.

Advantageous Effects of Disclosure

According to the present disclosure, accuracy of global navigation satellite system (GNSS) positioning can be improved compared to when a weight is not applied. Also, the accuracy of the GNSS positioning can be further improved when data processing according to a threshold value of a signal-to-noise ratio (SNR) value is additionally applied in addition to acceleration.

MODE OF DISCLOSURE

Figure 1:
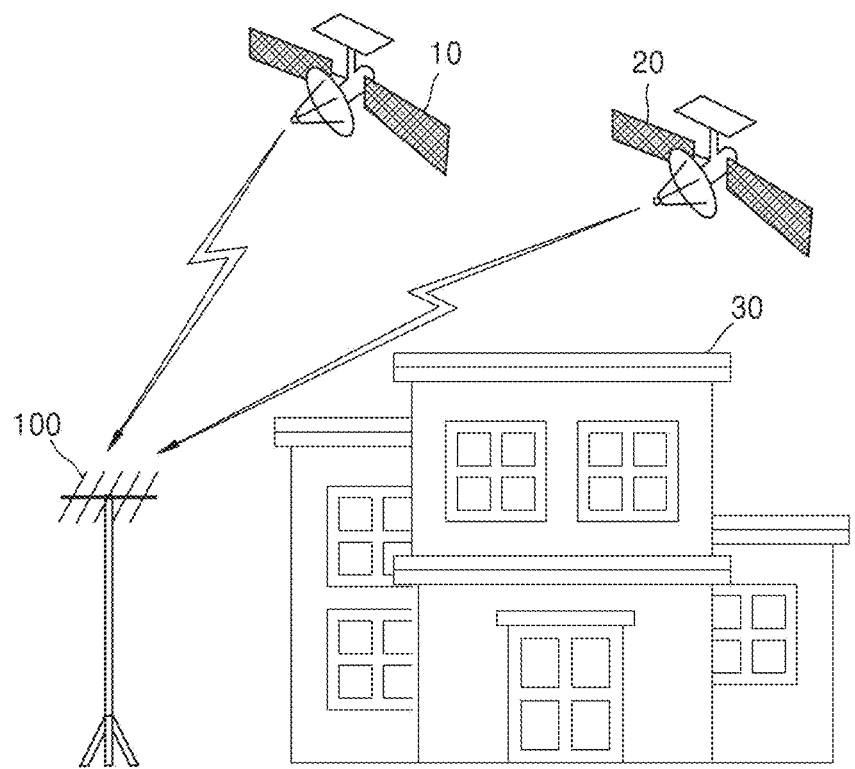
FIG. 1 illustrates a global navigation satellite system (GNSS) via a signal receiver, according to an embodiment of the present disclosure.

Hereinafter, various embodiments of the present disclosure will be described with reference to accompanying drawings. However, it is not intended to limit the techniques described in the present disclosure to specific embodiments, and it should be understood that various modifications, equivalents, and/or alternatives of the embodiments of the present disclosure are included. In relation to the description of drawings, like reference numerals may denote like elements.

In addition, expressions such as "first", "second"; etc. used in the present disclosure modify various elements regardless of an order and/or importance, and are only used to distinguish one element from another element and do not limit the components. For example, a first user device and a second user device may represent different user devices regardless of an order or importance. For example, without departing from the scope of the rights described in the present disclosure, a first component may be referred to as a second component, and similarly, a second component may be referred to as a first component.

When it is described that a component (e.g., a first component) is "(functionally or communicatively) coupled with/to" or "connected to" another component (e.g., a second component), it should be understood that the component may be directly connected to the other component or may be connected thereto through another component (e.g., a third component). On the other hand, when it is described that a component (e.g., a first component) is "directly coupled" or "directly connected" to another component (e.g., a second component), it may be understood that there is no component (e.g., a third component) between the component and the other component.

In an embodiment of the present disclosure, terms such as "module", "unit", "part", and the like are terms used to refer to components that perform at least one function or operation, and these components may be implemented as hardware or software, or implemented as a combination of hardware and software. In addition, a plurality of "modules", "units", "parts", and the like may be integrated into at least one module or chip to be implemented as at least one processor, except when each "module, "unit", "part", and the like needs to be implemented as individual specific hardware.

Terms used in the present disclosure are used only to describe a specific embodiment, and may not be intended to limit the scope of other embodiments. An expression used in the singular may encompass the expression in the plural, unless it has a clearly different meaning in the context. Terms used herein, including technical or scientific terms, may have the same meaning as commonly understood by one of ordinary skill in the art described in the present disclosure. Among terms used in the present disclosure, terms defined in a general dictionary may be interpreted as having the same or similar meanings as those in the context of the related technology, and unless explicitly defined in the present disclosure, the terms are not interpreted in ideal or excessively formal meanings. In some cases, even terms defined in the present disclosure cannot be interpreted to exclude embodiments of the present disclosure.

Hereinafter, various embodiments of the present disclosure will be described in detail with reference to the accompanying drawings.

Figure 2:
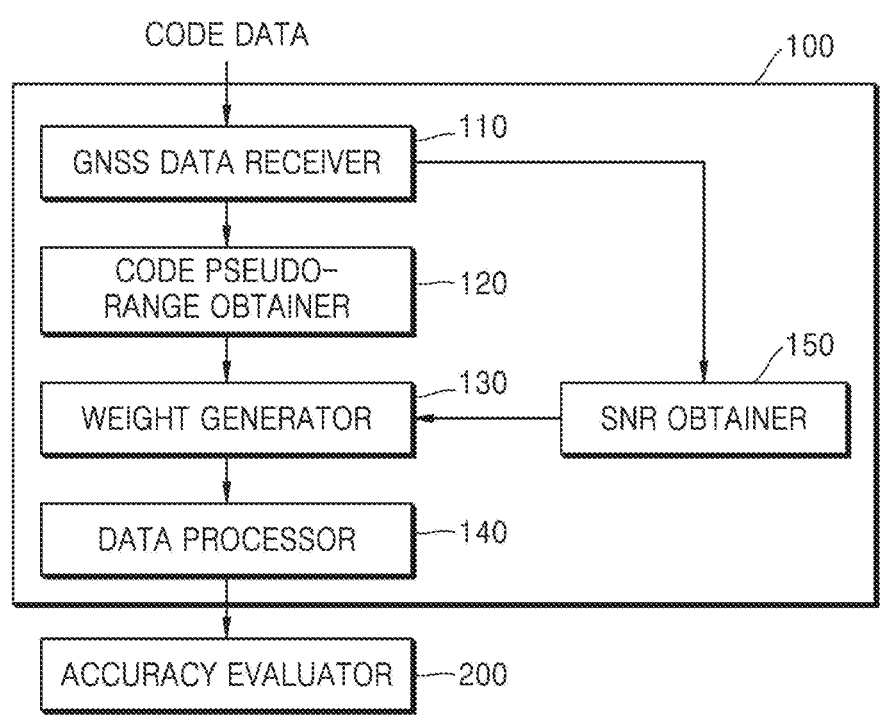
FIG. 2 is a simple block diagram for explaining components of a receiver system, according to an embodiment of the present disclosure.

FIGS. 1 and 2 are diagrams schematically explaining a global navigation satellite system (GNSS) and a signal receiver, according to an embodiment of the present disclosure.

In particular, FIG. 1 illustrates a GNSS via a signal receiver, according to an embodiment of the present disclosure.

Referring to FIG. 1, a receiver system 100 may receive a signal in an environment in which an obstacle 30, such as a building, shielding the signal is present. The receiver system 100 may receive data signals transmitted from a plurality of satellites through an antenna, and for example, may receive data signals from a first satellite 10 and a second satellite 20. Here, the receiver system 100 may be a u-blox EVK-M8T and the antenna may be a small active antenna included in an evaluation kit, but are not limited thereto. In the drawing, the receiver system 100 is shown to be fixedly installed, but the present disclosure is not limited thereto, and the receiver system 100 may be a portable and/or mobile receiver.

Meanwhile, the signal transmitted by the first satellite 10 or the second satellite 20 may be through two carrier waves L1 (1575.42 MHz) and L2 (1227.6 MHz). Here, carrier code is phase-modulated with irregular code of C/A code and P code, and satellites contain unique pseudo-random noises (PRNs) with bit rates of 1.023 Mbps and 10.23 Mbps, respectively.

The C/A code is open to a private sector, but the P code is encoded by using unpublished W code exclusive for military purposes, and the encrypted P code is referred to as Y code or P(Y) code. Navigation information is divided into a standard positioning service (SPS) and a precise positioning service (PPS) to provide services. The SPS is a business of positioning and time transmission, and is used for civilian use and thus only uses the C/A code of an L1 frequency. The PPS is mainly designed for military use, has positioning, timing, and velocity functions, and uses the P(Y) code of L1 and L2. The PRN may be a binary sequence of 1s and 0s having noise-like properties.

The receiver system 100 may receive a direct signal from the first satellite 10. On the other hand, when receiving a signal from the second satellite 20, the receiver system 100 may indirectly receive the signal because the signal is shielded by the obstacle 30.

A pseudo-range, which is a phase distance between a satellite and an antenna of the receiver system 100, the pseudo-range being measured by a delay-lock loop (DLL) using the C/A code or the P code, may include an error caused by a clock of the receiver system 100 and a radio wave area regarding an atmospheric layer. In independent positioning, the pseudo-range is obtained by observing distances of four satellites, and the distance may be obtained by calculating a difference between a time when a radio wave leaves the satellite and a time when the radio wave arrives a receiver. The pseudo-range may primarily include the error included in the clock of the receiver system 100, and secondarily include an error included in a satellite clock, an error of influence of the atmosphere, and the like.

In calculation of the pseudo-range, signals transmitted from the first and second satellites 10 and 20 need to be received in a straight line because a time taken for the signals to reach the ground is the most important factor. For example, when the signal transmitted from the second satellite 20 collides with a concrete jungle including the obstacle 30, a delay time occurs and thus an error occurs. As such, the signal coming from the second satellite 20 is not a direct signal but a reflected multipath signal. The multipath signal enters the receiver through a longer path, resulting in false position calculation and a multipath error.

Also, strength of the multipath signal may be weakened as the multipath signal collides several times. Like ionosphere and convection zone errors, the multipath error has a greater influence as a satellite approaches the horizon. In other words, because accuracy of a signal is decreased as an elevation angle of a satellites decreases, the receiver system 100 may measure a position using only a satellite having an elevation angle (mask angle) of a certain degree or higher.

Referring to FIG. 1, the receiver system 100 may receive a direct signal including a line of sight (LoS) signal from the first satellite 10, but a signal through the second satellite 20 is a multipath signal that passed through the obstacle 30, and thus the receiver system 100 may receive a signal including a multipath error. In addition, accuracy of the signal received from the second satellite 20 may be low because an elevation angle of the second satellite 20 is lower than that of the first satellite 10.

According to an embodiment, the receiver system 100 may model a signal-to-noise ratio (SNR) in a form of an exponential function by using a characteristic that an SNR is reduced when a signal is reflected to an obstacle, such as a multipath signal, to use a weighted model of reducing a multipath error for the signal from the second satellite 20. In addition, the receiver system 100 may use the weighted model using both the elevation angle and the SNR, by using a characteristic that the second satellite 20 having a low elevation angle is relatively affected more by the obstacle 30. However, an exponential function model of the SNR and an elevation angle-SNR combination model still show a limitation that a positioning error equal to or greater than 10 meters occurs in an urban environment.

Accordingly, the receiver system 100 according to an embodiment of the present disclosure may use a model using, as a weight, an acceleration of a code pseudo-range observation value generated by the receiver system 100, by using a characteristic that a fluctuation rate of a signal reflected at an obstacle or the like is very large compared to a directly received signal including an LoS signal.

In addition, the receiver system 100 according to another embodiment of the present disclosure may use a model to which a threshold value of an SNR value is additionally applied in addition to an acceleration, so as to compensate for a fact that an acceleration similar to an LoS signal is measured in a significant epoch.

FIG. 2 is a simple block diagram for explaining components of a receiver system, according to an embodiment of the present disclosure.

Referring to FIG. 2, the receiver system 100 of the present disclosure may include a GNSS data receiver 110, a code pseudo-range obtainer 120, a weight generator 130, a data processor 140, and an SNR obtainer 150.

The GNSS data receiver 110 may receive a data signal from at least one GNSS satellite. The data signal may be through two carrier waves L1 (1575.42 MHz) and L2 (1227.6 MHz). Here, carrier code is phase-modulated with irregular code of C/A code and P code, and satellites contain unique PRNs with bit rates of 1.023 Mbps and 10.23 Mbps, respectively. The GNSS data receiver 110 may be a small active antenna, but is not limited thereto.

The code pseudo-range obtainer 120 may obtain a pseudo-range with at least one GNSS satellite, based on the data signal received from the GNSS data receiver 110. Here, the pseudo-range denotes an approximate distance between the GNSS satellite and the receiver system 100, and may be calculated by multiplying a time taken for the data signal transmitted from the GNSS satellite to be received by the GNSS data receiver 110 of the receiver system 100 by the velocity of light.

The weight generator 130 may generate a weight to be applied to the data signal, according to an embodiment of the present disclosure. Specifically, the weight generator 130 may generate the weight according to a linear model, a polynomial model, or an exponential model, according to an embodiment of the present disclosure. Here, the weight generator 130 may use, as a variable of each weighted model, a range-acceleration obtained based on the pseudo-range obtained by the code pseudo-range obtainer 120. That is, the weight generator 130 may apply the weight according to each weighted model to the range-acceleration.

Meanwhile, the SNR obtainer 150 may obtain an SNR of the data signal received through the GNSS data receiver 110. The SNR obtainer 150 may identify a data signal indicating an SNR, in which the obtained SNR is lower than a preset first value, and transmit corresponding information to the weight generator 130. The first value may be an arbitrarily set value, for example, 40 dB.

The weight generator 130 may assume a preset second value as a range-acceleration of a data signal indicating an SNR lower than the first value from the SNR obtainer 150, with respect to the data signal. That is, the weight generator 130 may apply a weight to the second value. The second value may be an arbitrarily set value, for example, 100 m/s$^2$.

The data processor 140 may perform data processing on the obtained data signal via a weight value acquired by the weight generator 130. In particular, the data processor 140 may apply, to the obtained data signal, a result value according to each weighted model of the weight generator 130, as a variance.

An accuracy evaluator 200 may evaluate accuracy of a root mean square error (RMSE) calculated through the least square method for a predetermined period. However, this is only an example, and the accuracy evaluator 200 may evaluate the accuracy via, in addition to RMSE, a regression model through a mean absolute error (MAE), a classification model through a receiver operating characteristic curve (ROC), or the like, or any one of various tools, such as a circular error probable (CEP), a spherical error probable (SEP), dRMS, and R95.

In FIG. 2, the accuracy evaluator 200 is implemented as a separate component from the receiver system 100, but is not limited thereto, and the accuracy evaluator 200 may be a component included in the receiver system 100. In addition, according to another embodiment of the present disclosure, at least one of the components configuring the receiver system 100 may be implemented as a separate component from the receiver system 100.

Figure 3:
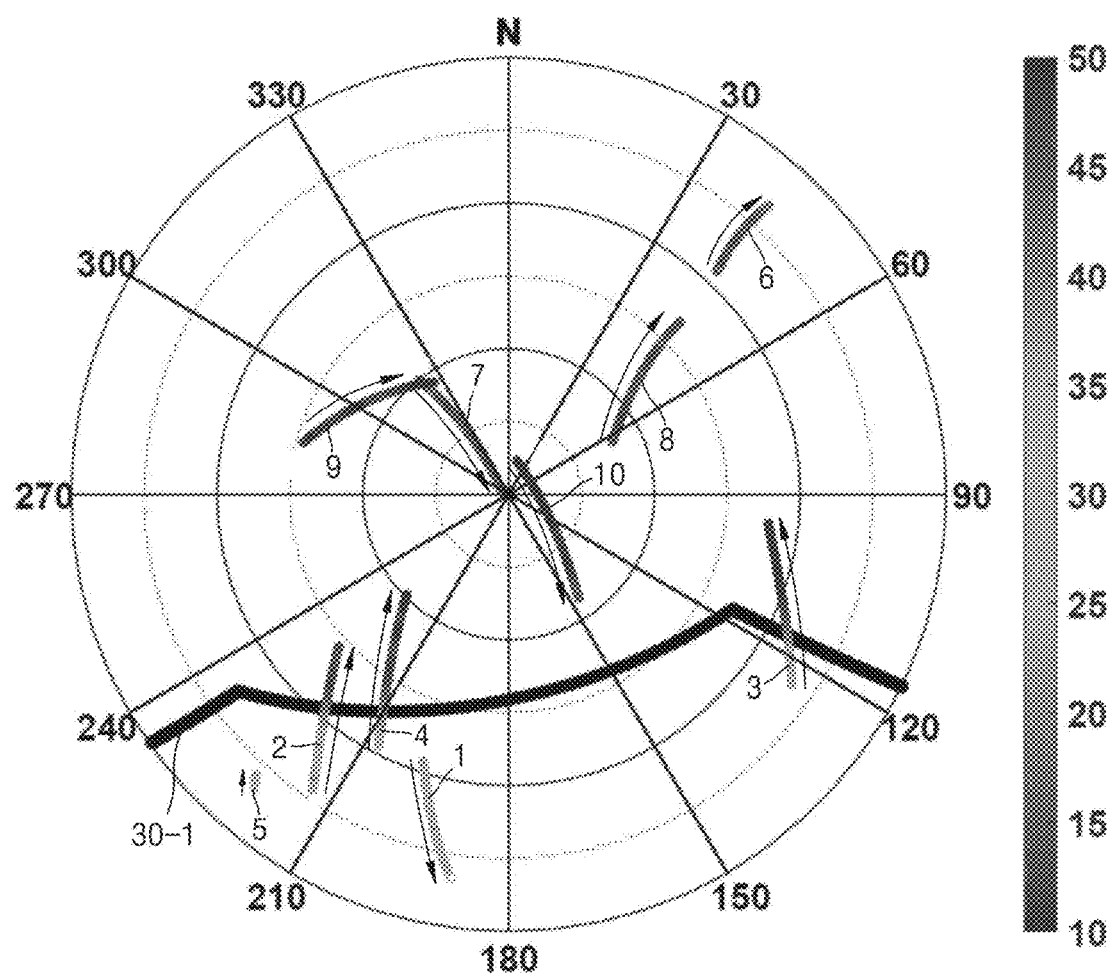
FIG. 3 illustrates a satellite signal skyplot after a signal is received for a total of 60 minutes through a receiver.

FIG. 3 illustrates a satellite signal skyplot after a signal is received for a total of 60 minutes through a receiver.

FIG. 3 illustrates a skyplot in which the receiver system 100 according to an embodiment of the present disclosure observed satellite signals for a total of 60 minutes from 06:36 to 07:36. A total of 10 satellites were observed in the skyplot, and the satellites have PRNs 1 to 10, respectively. Here, PRNs 1 to 10 are exemplarily listed for convenience of description, and the PRN is a unique PRN included in each satellite.

A trajectory direction of each satellite is indicated by an arrow on the skyplot, and a part where the arrow starts is a position of each satellite during first observation. A bar on a right side of the skyplot represents information about an SNR of an observed signal (SNR 10 to 50). Referring to FIG. 3, a satellite with a high elevation angle (close to the center based on the skyplot) shows a high SNR value.

In the skyplot, an outline 30-1 of an obstacle such as a building is shown. Referring to FIG. 3, the obstacle 30 may occupy an azimuth of 120° to 240°, and shield a signal having an elevation angle of 45° or more in an azimuth range of 150° to 180°.

In other words, PRNs of satellites where a phenomenon in which the LoS is not secured by being shielded by the obstacle 30 is found are 1, 2, 3, 4, and 5, thus a total of five. Thereamong, satellites PRNs 2, 3, and 4 may be determined to have been observed by passing through the outline 30-1 of the building.

The receiver system 100 may observe that SNR values of the satellites PRNs 2, 3, and 4 are very low within the outline 30-1, that is, in a section where the LoS is not secured. However, the receiver system 100 may observe that the SNR values rapidly increase as the satellite PRNs 2, 3, and 4 each deviate from the outline 30-1. The receiver system 100 receives a signal with a low SNR due to a multipath error in an area where the LoS is not secured, but may receive a signal with a normal SNR in a situation where a signal is not shielded by the obstacle 30.

FIGS. 4A through 4C, and 5 are diagrams for explaining a fluctuation rate of a code range-acceleration of a reflected signal.

Figure 4A:
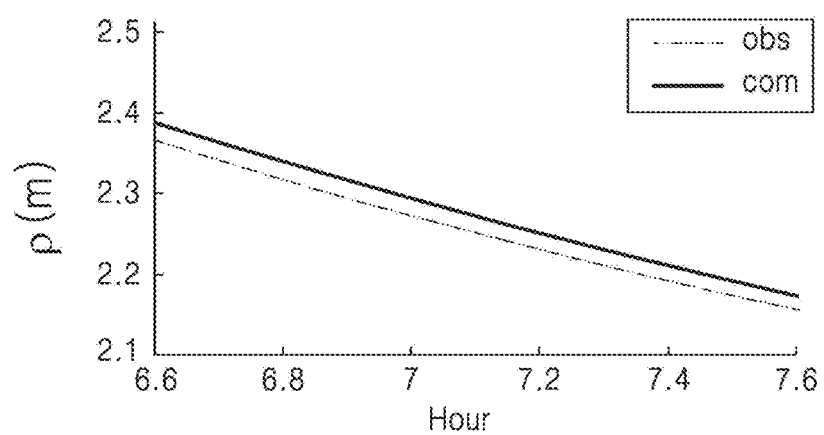
FIGS. 4A through 4C are diagrams for explaining characteristics of a pseudo-range, a range-rate, and a range-acceleration of a pseudo-random noise (PRN) 2 satellite observed for 60 minutes by a receiver of the present disclosure.
Figure 4B:
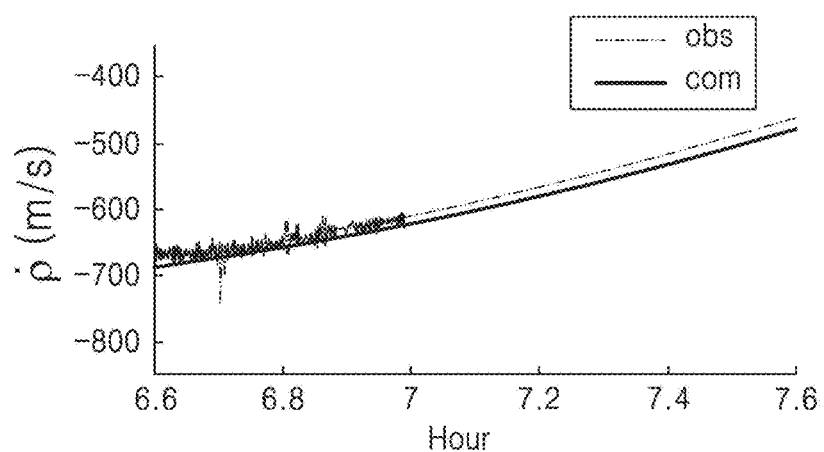
Figure 4C:
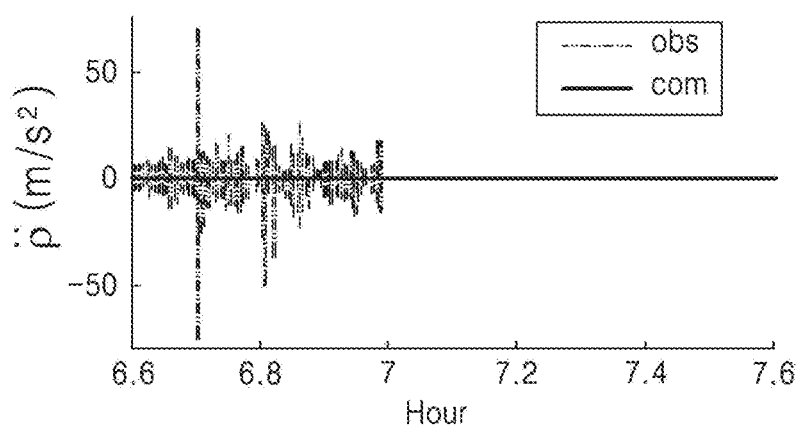

In particular, FIGS. 4A through 4C are diagrams for explaining characteristics of a pseudo-range, a range-rate, and a range-acceleration of a PRN 2 satellite observed for 60 minutes by a receiver of the present disclosure.

The receiver system 100 may obtain fluctuation characteristics of a code pseudo-range measured after collecting a signal from a satellite, a range-rate obtained by performing differentiation with respect to a time of the code pseudo-range, and a range-acceleration that is a second time derivative obtained by performing differentiation again on a time fluctuation rate with respect to time.

Referring to FIG. 4A, the receiver system 100 may observe a satellite PRN 2 for 60 minutes from 06:36 to 07:36, and obtain a code pseudo-range of the satellite PRN 2.

In detail, obs in FIG. 4A denotes an observation value of a C/A code pseudo-range recorded in the receiver system 100. Also, com in FIG. 4A denotes a distance value calculated by predicting coordinates of the satellite PRN 2 via a navigation message and then inputting coordinates of the receiver system 100 accurately measured in the past. At this time, the coordinates of the receiver system 100 may be measured via real-time kinematic (RTK) in advance, but they are not limited thereto.

Referring to FIG. 4A, the satellite PRN 2 may be covered by the obstacle 30 from 06:36 to 07:00, and thus the LoS with the receiver system 100 may not be secured. Nevertheless, the receiver system 100 may receive a signal of the satellite PRN 2 through multipaths such as diffraction, reflection, and the like. The receiver system 100 may fail to receive the signal due to excessive signal interference in some epochs, and may intermittently omit an observation value.

The pseudo-range obs observed by the receiver system 100 may include a calculated distance com and a bias. A size of the bias gradually decreases to 17,811 m starting from 22,254 m. When the size of the above-described bias is converted into time, the time corresponds to about 0.742 msec and 0.594 msec. Such a bias is due to a calculation error of the receiver system 100, and pseudo-range observation may be affected by a clock error of the receiver system 100, as well as a tropospheric error and ionosphere error.

FIG. 4B shows a range-rate obtained by performing differentiation with respect to a time of a code pseudo-range recorded in the receiver system 100. Since a GNSS satellite, such as satellite PRN 2, revolves based on the center of mass of the earth and an observation point is positioned on the ground surface, a distance between the receiver system 100 and the satellite PRN 2 may not be constant. Accordingly, a time fluctuation rate of a pseudo-range is unable to be 0, and a size thereof may fluctuate within a range of approximately ±800 m/sec. As identified in the skyplot of FIG. 3, since the satellite PRN 2 is a satellite, whose altitude starts to rise, the receiver system 100 may determine that a range-rate is decreasing after observation and determine that a value thereof is within ±800 m/sec, i.e., from −700 m/sec to −200 m/sec.

A $\rho\text{-}'_{com}$ value, i.e., a velocity calculated based on the coordinates of the receiver system 100 and orbit information of the satellite PRN 2, fluctuates very smoothly. On the other hand, $\rho'_{obs}$, i.e., a range-rate recorded in the receiver system 100, is very unstable and shows severe noise from 06:36 to 07:00 when the LoS is not secured due to a building. Since a multipath signal is received in an interval from 06:36 to 07:00, the receiver system 100 may measure that noise of a $\rho'_{obs\_\_}$ value is large.

The receiver system 100 may consider instability of the $\rho'_{obs\_\_}$ value to be due to an influence of a multipath, and use the $\rho'_{obs\_\_}$ value as a weight to be applied to a positioning algorithm. However, the $\rho'_{obs\_\_}$ value may have a value of ±800 m/sec depending on an azimuth, elevation angle, and movement direction of a satellite. That is, it is difficult for the receiver system 100 to use, as a reference, a specific value for determining the multipath signal. Accordingly, characteristics of a $\rho''_{obs}$ value may be examined through FIGS. 4C and 5.

FIG. 4C illustrates a range-rate or range speed differentiated with respect to time. Referring to FIG. 4C, a calculated acceleration $\rho''_{com}$ is distributed close to 0 m/s². On the other hand, a $\rho''_{obs}$ value is measured to be distributed close to 0 m/s² in a section of 7:00 to 7:36 where the LoS of the satellite PRN 2 and the receiver system 100 is secured, but in a section affected by a multipath, the $\rho''$obs value fluctuates rapidly in a range of ±50 m/s².

Figure 5:
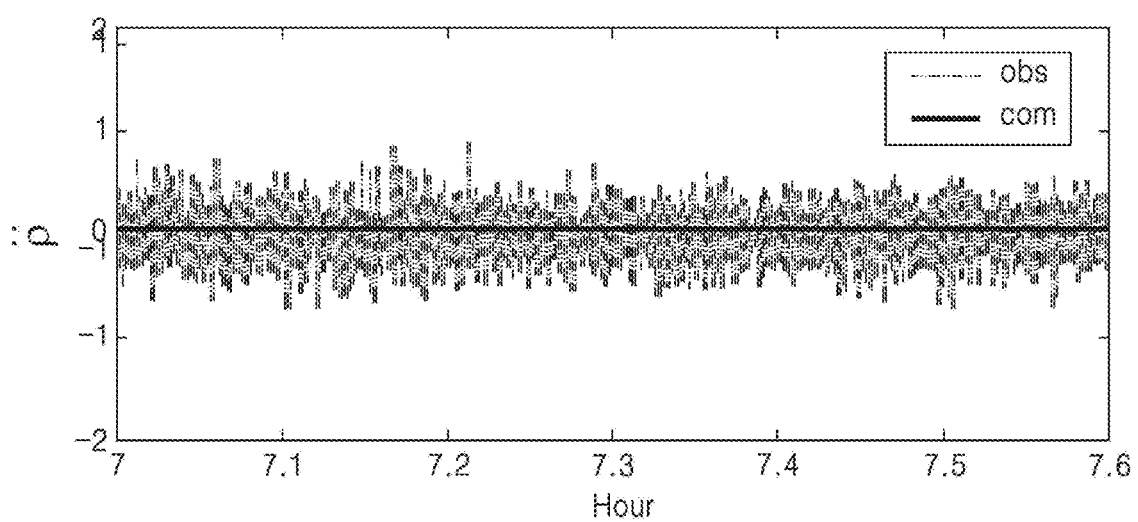
FIG. 5 is a diagram for explaining characteristics of a range-acceleration via a PRN 2 satellite observation result of a receiver of the present disclosure.

In particular, FIG. 5 is a diagram for explaining characteristics of a range-acceleration via a PRN 2 satellite observation result of a receiver of the present disclosure.

In particular, FIG. 5 is a graph showing a value of $\rho''$ for the satellite PRN 2, wherein a part after 7:00, which is time free from an influence of the obstacle 30, is enlarged by limiting a vertical axis to a range of ±2 m/s². The receiver system 100 may receive a direct signal as the LoS with the satellite PRN 2 is secured after 7:00.

Referring to FIG. 5, $\rho''_{com}$ is distributed close to 0 m/s². On the other hand, for a $\rho''$obs value, a maximum value is 1.0 m/s², an average value is 0.21 m/s², and a standard deviation is 0.15 m/s². That is, after 7:00 when the LoS is secured, the $\rho''$obs value also shows a stable value within a range of ±1 m/s². That is, since there is a characteristic that the $\rho''$obs value is more clearly distinguished than a $\rho'_{obs\_\_}$ value due to an influence of a multipath, according to an embodiment of the present disclosure, the receiver system 100 may use a $\rho''_{obs}$ value as a weighted model of data processing.

Figure 6:
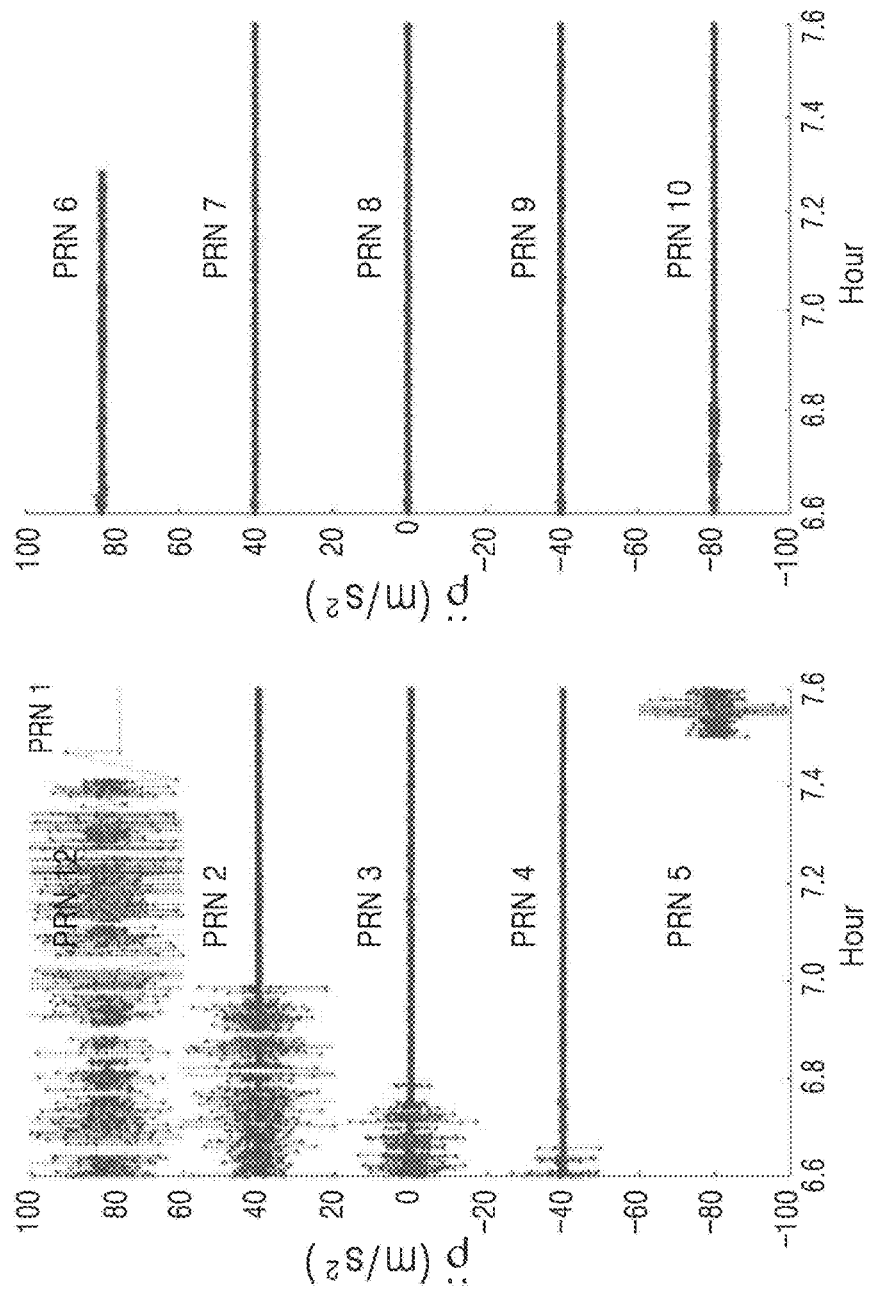
FIG. 6 is a diagram showing a range-acceleration of PRN 1 to 10 satellites observed by a receiver of the present disclosure.

FIG. 6 is a diagram showing a range-acceleration of PRN 1 to 10 satellites observed by a receiver of the present disclosure.

In FIG. 4C, a value of the range-acceleration of the satellite PRN 2 is stably maintained at a value close to 0 m/s² when the LoS is secured, whereas a fluctuation range thereof is very large in a multipath environment where the LoS is not secured. Similarly, looking at the skyplot of FIG. 3, it is identified that, in addition to the PRN 2, the satellite PRNs 1, 3, 4, and 5 are covered by the obstacle 30.

Referring to FIG. 6, the satellite PRNs 1 and 5 show a large fluctuation in range-acceleration for the longest time since the satellites PRNs 1 and 5 are covered by the obstacle 30 most of the time. For the satellite PRNs 2, 3, and 4 that are covered by the obstacle 30 and then escape therefrom, range-accelerations (RAs) maintain a stable value near 0 m/s² as soon as the satellite PRNs 2, 3, and 4 are out of an influence of shielding by the obstacle 30.

In addition, five satellite PRNs 5 to 10, which are not affected by the obstacle 30, show RA values close to 0 m/s² in all sections. Average values and standard deviations of the $\rho''$obs values of the satellite PRN 5 to 10 are 0.24±0.19 m/s², 0.16±0.14 m/s², 0.19±0.15 m/s², 0.18±0.14 m², and 0.24±0.19 m/s² in an order of the PRNs 5 to 10. In other words, the average values of $\rho''$obs values are all 0 or greater, wherein a maximum value is 0.24 m/s², and the standard deviations are all 0.2 m/s² or less.

As described above, noise levels of RA observation values of ten satellites show a very close relationship with whether the obstacle 30, such as a building, blocks a signal. Accordingly, the receiver system 100 according to an embodiment of the present disclosure may effectively determine whether a received signal is a multipath signal by assigning a weight to a range-acceleration (RA) to process data. In a multipath environment, by using a characteristic that RA contains severe noise, the receiver system 100 may use a difference between a calculated RA($\rho''_{com}$) and an observed RA($\rho''_{obs}$) to use the RA as a weight. That is, when a difference $\Delta\rho'' = \rho''_{obs} - \rho''$com is equal to or greater than a preset value, the receiver system 100 may determine that an environment in which a signal is received is a multipath environment.

Meanwhile, the receiver system 100 needs to calculate $\rho''$com in order to use $\Delta\rho''$ as a weight for data processing, and at this time, the coordinates of the receiver system 100 are required. However, in actual positioning, the coordinates of the receiver system 100 need to be estimated every time, and reliability of the coordinates estimated in a place where an observation environment is not good is inevitably low.

Accordingly, the receiver system 100 according to an embodiment of the present disclosure may use, as a reference of the weight, the observed RA($\rho''_{obs}$) having a higher utilization level instead of $\Delta\rho''$. In detail, the calculated RA($\rho''_{com}$) is very stable compared to the observed RA($\rho''_{obs}$), and a value thereof is distributed near 0 m/s². That is, compared to the observed RA($\rho''_{obs}$) showing a maximum of ±50 m/s² in FIG. 4C, a fluctuation of the calculated RA($\rho''_{com}$) is very small. Therefore, the calculated RA($\rho''_{com}$) may have a small influence that may be ignored, even when not applied as a weight to an actual positioning algorithm. Accordingly, the receiver system 100 may use, as an RA to be used as a weight for the positioning algorithm, only the observed RA($\rho''_{obs}$) excluding RA($\rho''_{com}$) calculated from $\Delta\rho'' = \rho''_{obs} - \rho''$com. That is, the receiver system 100 may set a weight only with the pseudorange observation value recorded in the receiver system 100 regardless of the coordinates of the receiver system 100.

Figure 7:
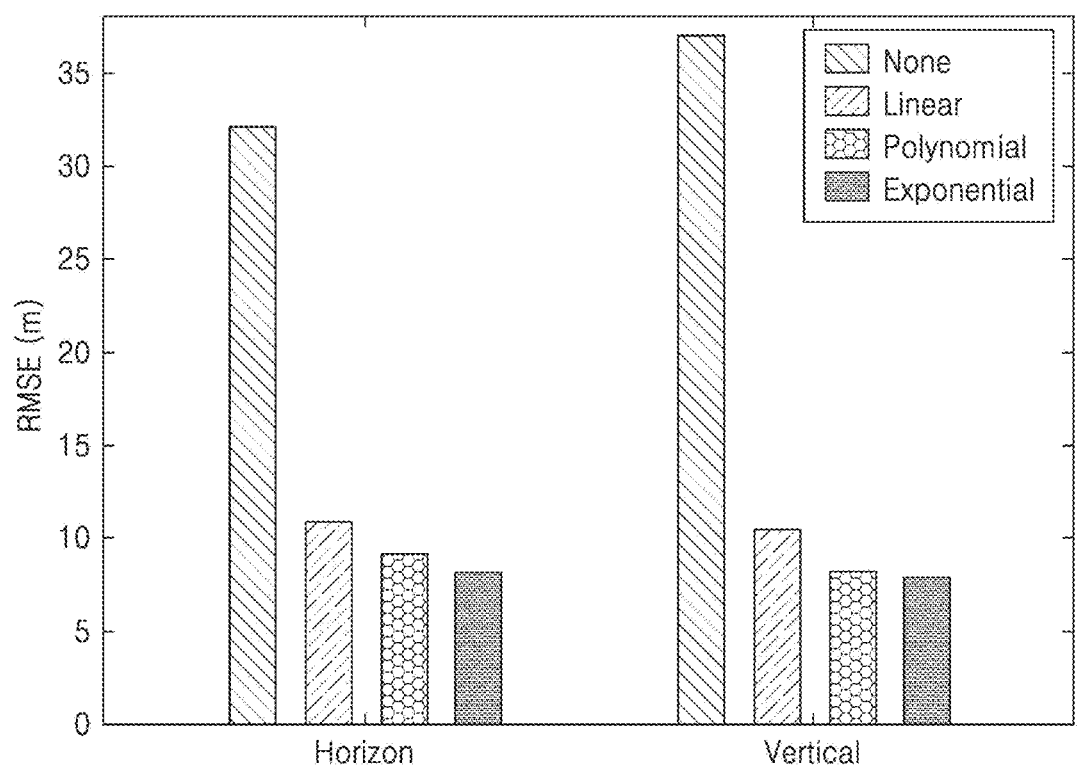
FIG. 7 is a graph for comparing effects of applying a weight to a range-acceleration via a plurality of methods by a receiver, according to an embodiment of the present disclosure.

FIG. 7 is a graph for comparing effects of applying a weight to a range-acceleration via a plurality of methods by a receiver, according to an embodiment of the present disclosure.

The receiver system 100 according to an embodiment of the present disclosure may apply, as a noise model that assigns a weight the range-acceleration, three types: a linear model, a polynomial model, and an exponential model. The linear model may be $\sigma_i = \alpha * \rho''_{obs}$, the polynomial model may be $\sigma_i = \alpha * (\rho''_{obs})^2$, and the exponential model may be $\sigma_i = \alpha * \exp(k * \rho''\text{obs})$. Here, σi may be a variance to be applied to each observation value, and α and k may be optimal parameters determined experimentally. Here, when the variance is applied to data processing, a unit may be m/s². The receiver system 100 may process C/A code pseudo-range data every second for 1 hour from 06:36 to 07:36, and at this time, the receiver system 100 may estimate 3 coordinates and 1 clock error, i.e., a total of 4 unknowns, while applying a least square method (LS). A position of the receiver system 100 may be determined by RTK measurement.

Accuracy of RMSE calculated via the least square method of a total of 1 hour to evaluate positioning accuracy of a weighted model is as shown in FIG. 7.

Referring to FIG. 7, the accuracy of RMSE in which a weight is not applied to the range-acceleration is 32.1 m horizontally and 37.0 m vertically. RMSE of the linear model indicates 10.9 m horizontally and 10.5 m vertically, and the accuracy is improved by approximately 65% compared when the weight is not applied to the range-acceleration. In RMSE to which a second-order polynomial model is applied, the accuracy is improved by about 70% to 9.1 m horizontally and 8.1 m vertically, the accuracy being higher than the linear model. Finally, RMSE of the exponential model is 8.2 m horizontally and 7.9 m vertically, and improvement rates are 75% and 79%, respectively.

In other words, among the three models, the exponential model may show a highest improvement rate. Accordingly, the receiver system 100 according to an embodiment of the present disclosure may apply the range-acceleration as a weight through the exponential model.

Figure 8:
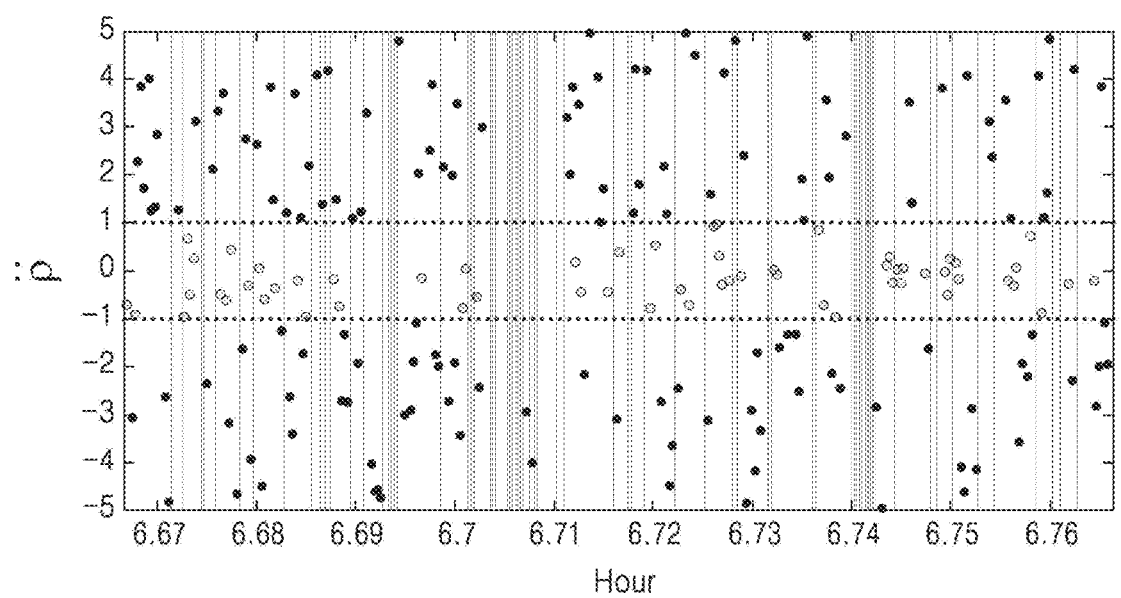
FIG. 8 is a diagram for explaining nonuniformity of a range-acceleration observed by a receiver.

FIG. 8 is a diagram for explaining nonuniformity of a range-acceleration observed by a receiver.

The receiver system 100 of the present disclosure uses a multipath error reduction model by using RA ($\rho''_{obs}$), which is a multipath error index, as a weight, but accuracy may be decreased in some epochs. Such a phenomenon may occur even for a multipath signal when a RA($\rho''$obs) value is low. That is, even for the multipath signal, when a low RA ($\rho''_{obs}$), such as a direct signal, is measured, the receiver system 100 may be unable to distinguish the direct signal from a normal signal that is not affected by a building according to an algorithm. When a low RA($\rho''_{obs}$) value appears even though it is obvious that the multipath signal is affected by a multipath error, the receiver system 100 obtains a result of significantly reduced accuracy in a corresponding epoch when the calculated RA($\rho''_{obs}$) is applied as a weight.

FIG. 8 is a view of a RA($\rho''_{obs}$) value in a partial time period in which it is clear that a signal reflected from the obstacle 30, such as a building, is recorded in the receiver system 100, the RA($\rho''_{obs}$) value being enlarged within a range of ±5 m/s$^2$. In particular, FIG. 8 illustrates a total of 360 epochs at 1 second intervals from 06H:40M:00S to 06H:45M:59S among the RA($\rho''_{obs}$) values of the satellite PRN 2 shown in FIG. 4C.

Referring to FIG. 8, a solid gray line may be an epoch from which data is missing. A total of 360 RA($\rho''_{obs}$) observation values need to appear, but there are a total of 73 missing epochs indicated by the solid gray line, which amounts to 20.3%. This may be a case where data is not recorded in the receiver system 100 due to signal interference such as a multipath. In addition, there are 223 epochs showing large RA observation values outside a range of ±1 m/s$^2$, i.e., 62%, and there are 64 epochs showing RA observation values within ±1 m/s$^2$, i.e., 17.8%. In other words, even when it is clear that an environment is affected by a multipath because the epochs showing the large RA observation values outside the range of ±1 m/s$^2$ are an absolute majority, the receiver system 100 observes low RA values for the epochs corresponding to 17.8% of the total, like a signal in which the LoS is secured.

The receiver system 100 according to an embodiment of the present disclosure may use an SNR, i.e., a signal strength, recorded in the receiver system 100, as an additional index, in consideration of a phenomenon in which a low RA value is observed in some epochs even in a multipath environment. This will be described in detail with reference to FIGS. 9A through 9C.

Figure 9A:
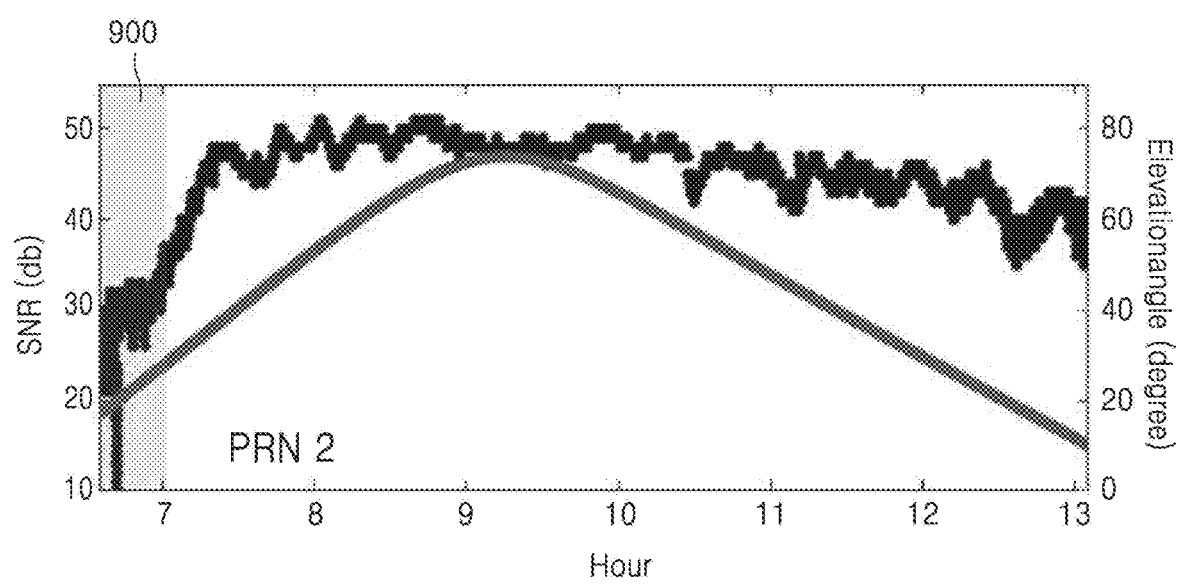
FIGS. 9A through 9C are diagrams for explaining a correlation between an SNR of a signal received by a receiver, and an altitude and a degree of shielding of a satellite.
Figure 9B:
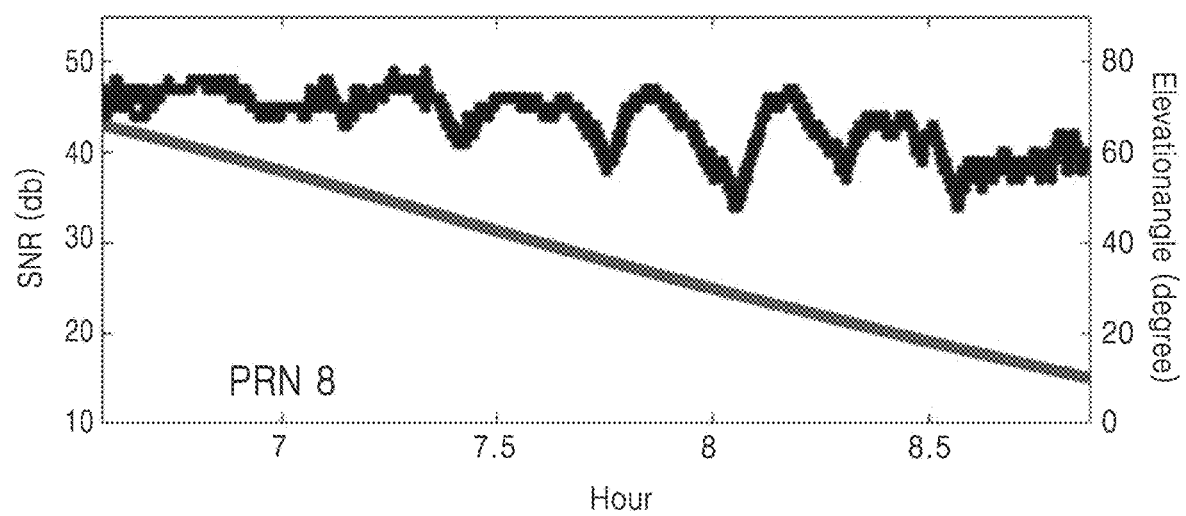
Figure 9C:
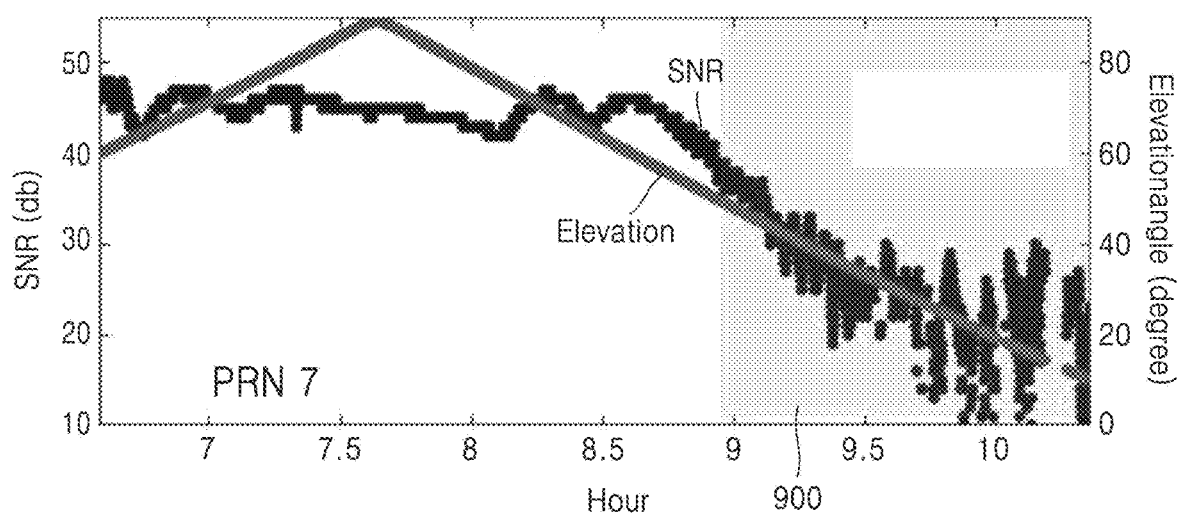

FIGS. 9A through 9C are diagrams for explaining a correlation between an SNR of a signal received by a receiver, and an altitude and a degree of shielding of a satellite. Satellite PRNs 2, 8, and 7 of FIGS. 9A through 9C are each an exemplary satellite displayed in the skyplot obtained in FIG. 3.

FIGS. 9A through FIG. 9C illustrate changes of elevation angles and SNR values according to time of the satellite PRN 2, the satellite PRN 8, and the satellite PRN 7, respectively. In FIGS. 9A and 9C, a shielded area 900 may be a section in which the LoS is not completely secured because a satellite is covered by an obstacle such as a building.

Referring to FIG. 9A, in the satellite PRN 2, the elevation angle indicates a maximum value of 75° at 09:12, and indicates a minimum value of 10° at 13:00. An SNR of a signal received from the satellite PRN 2 is about 50 decibels (dB) at the elevation angle of 75° and about 40 decibels at the elevation angle of 10°. In the satellite PRN 2, the SNR in the shielded area 900 before 07:00 shows a value as low as about 30 dB, and the SNR rapidly increases as the satellite PRN 2 approaches a boundary of the building (an end portion of the shielded area). In particular, a rate of increase of the SNR increases dramatically at the end portion of the shielded area 900 than a rate of increase of the altitude of the satellite PRN 2.

Referring to FIG. 9B, since the satellite PRN 8 is not affected by shielding throughout an observation time, approximately consistent LoS may be secured. In the satellite PRN 8, an SNR shows 47 dB at a maximum elevation angle of 67°, and shows a relatively high 40 dB even at a lowest elevation angle of 10°.

Referring to FIG. 9C, the satellite PRN 14 shows a low SNR from the shielded area 900 affected by the building, like the satellite PRN 2.

In other words, when SNR characteristics of the satellites of FIGS. 9A through 9C are analyzed, an SNR of a satellite signal is affected by an elevation angle, but maintains 35 dB or more when there is no influence from a building (not a shielded area). However, when there is an influence from the building (the shielded area), the SNR of the satellite signal decreases rapidly regardless of the elevation angle.

In conclusion, when the LoS of the satellite is secured, the SNR value of the satellite signal does not decrease sharply even when the elevation angle decreases, but in the shielded area 900, in which the satellite signal becomes a multipath signal due to interference by the building, the SNR of the satellite signal is significantly reduced.

This may be the same conclusion as the receiver system 100 receiving a sharply increasing or decreasing SNR value near the outline 30-1 of the obstacle, as shown in the skyplot of FIG. 3. Accordingly, the receiver system 100 according to an embodiment of the present disclosure may use an SNR as an additional index of a multipath signal caused by an obstacle.

Meanwhile, a method of selecting a criterion (threshold value) of an SNR to be used by the receiver system 100 of the present disclosure, as an additional index of a multipath signal, will be described with reference to FIG. 10.

Figure 10:
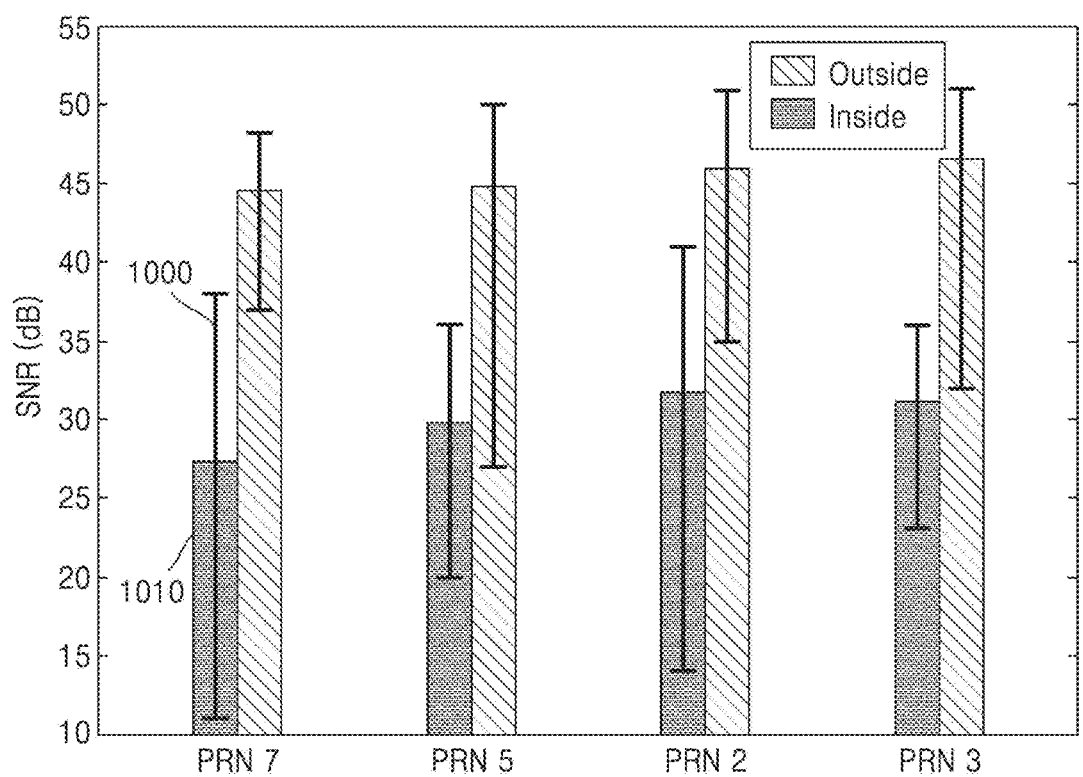
FIG. 10 is a graph showing SNR statistics for four satellites (PRNs 2, 3, 5, and 7) affected by a multipath among satellites shown in the skyplot of FIG. 3.

FIG. 10 is a graph showing SNR statistics for four satellites PRNs 2, 3, 5, and 7 affected by a multipath among satellites shown in the skyplot of FIG. 3.

FIG. 10 illustrates an SNR fluctuation cap 1000 and a fluctuation result average SNR 1010 of each satellite. Referring to FIG. 10, four satellites have an average SNR in a range of 27 to 32 dB in an area (inside) affected by a multipath caused by a building, and in a range of 45 to 47 dB in an area (outside) not affected by the multipath.

The receiver system 100 of the present disclosure may set a specific SNR value as a threshold value, and determine a signal indicating an SNR lower than the threshold value to be a signal affected by the multipath. In particular, the receiver system 100 according to an embodiment of the present disclosure may primarily apply an exponential model ($\sigma_i = \alpha * \exp(k * \rho''_{obs})$), based on a $\rho''$obs value, and secondarily apply an SNR threshold value.

For example, the receiver system 100 of the present disclosure may set the SNR threshold value to 40 dB through various tests, and for a signal having a lower SNR, a range-acceleration ($\rho''$obs) value of the signal may be applied as 100 m/s$^2$. The threshold value and the range-acceleration value to be applied are only examples, and the receiver system 100 of the present disclosure may use various threshold values and range-acceleration values to be applied.

According to the above-described embodiment, the receiver system 100 of the present disclosure may determine, to be a multipath signal, a signal observed with a low acceleration like a direct signal due to an accidental reason among the multipath signals, and process the determined multipath signal like a multipath signal having a high acceleration.

Figure 11:
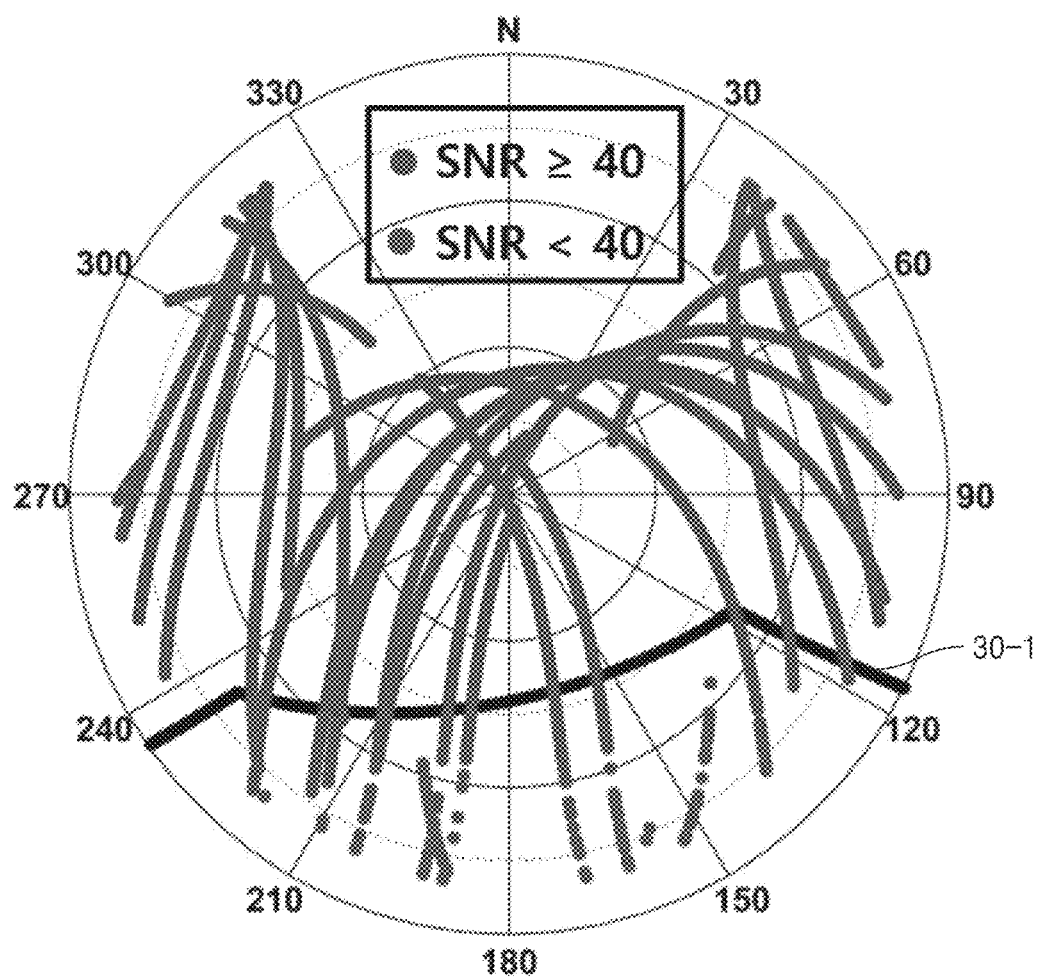
FIG. 11 is a skyplot showing together SNRs of all satellites observed by a receiver for a certain time.

FIG. 11 is a skyplot showing together SNRs of all satellites observed by a receiver for a certain time.

FIG. 11 is the skyplot of all satellites observed for about 8 hours and 25 minutes from 06:35 to 15:00 by the receiver system 100 according to the above embodiment, wherein the SNR is shown in blue when equal to or greater than 35 dB and shown in red when less than or equal to 40 dB.

According to the current embodiment, it is determined that the outline 30-1 of the building significantly matches boundaries of blue and red representing a change in SNR. Therefore, in the current embodiment, it is determined that the receiver system 100 setting SNR 40 dB as a threshold value is reasonable. However, as described above, this is only an embodiment, and the receiver system 100 may set various dB as threshold values via various methods.

Figure 12A:
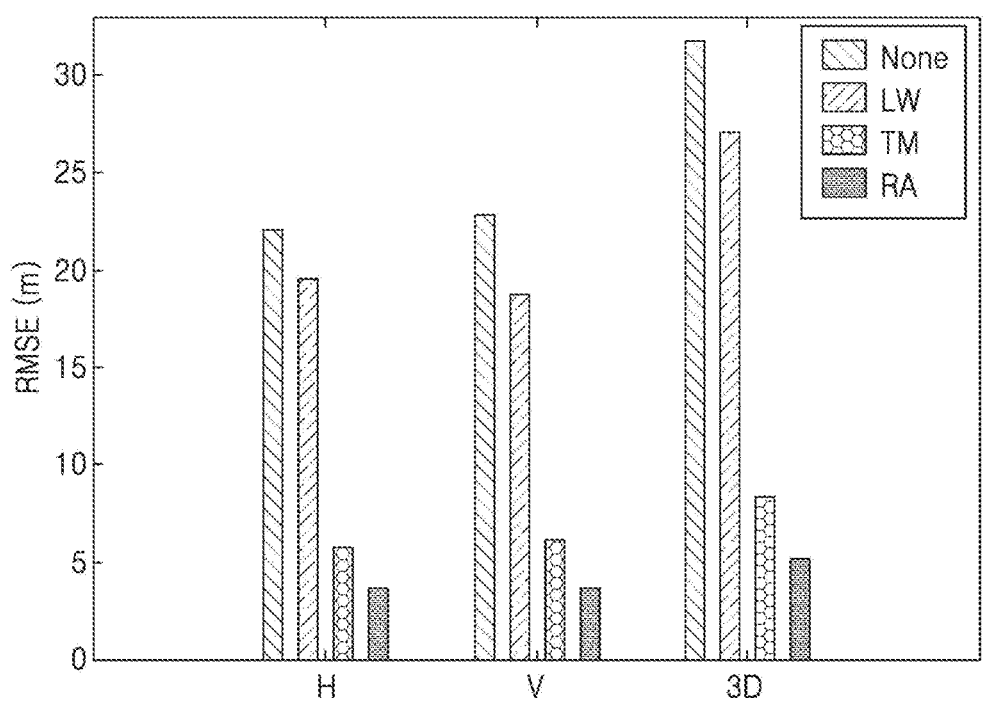
FIGS. 12A and 12B are diagrams for comparing a data processing effect of a receiver according to an embodiment of the present disclosure with a general data processing method.
Figure 12B:
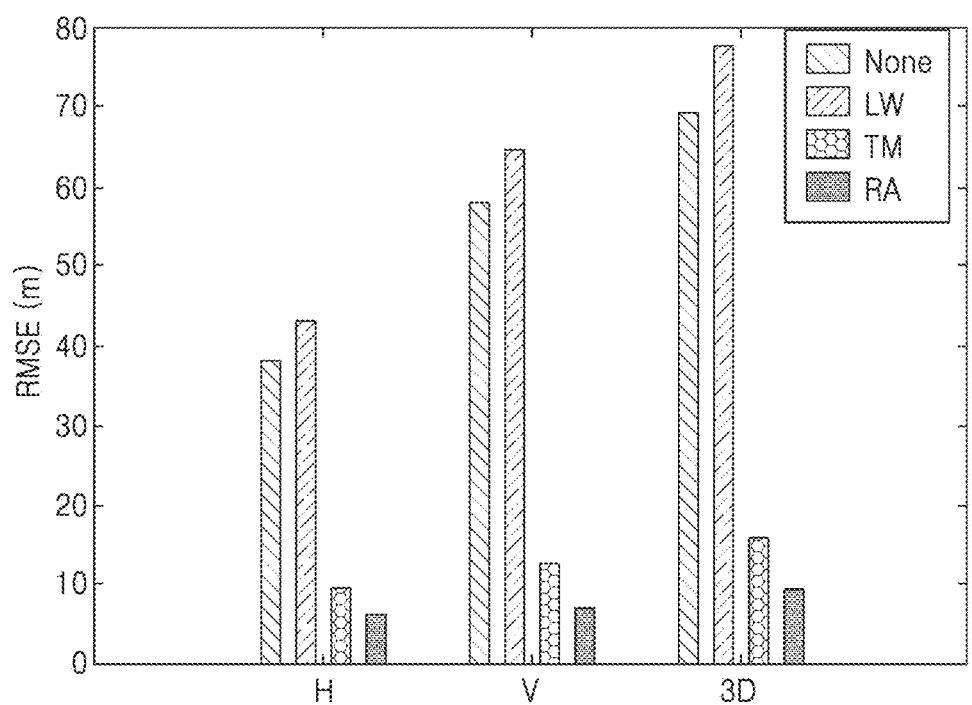

FIGS. 12A and 12B are diagrams for comparing a data processing effect of a receiver according to an embodiment of the present disclosure with a general data processing method. Positioning accuracy may be compared by using an RMSE value. The receiver system 100 may apply the Li and Wu (2009) model, the Tay and Marais (2013) model, and the model of the present disclosure as weights by using observed data, and calculate accuracy thereof as horizontal and vertical RMSEs. For convenience of explanation, hereinafter, a weighted model of the present disclosure is referred to as RA, the Li and Wu (2009) model is referred to as LW, and the Tay and Marais (2013) model is referred to as TM. Pieces of data collected by the receiver system 100 are processed via least square method estimation and results thereof are compared.

FIG. 12A illustrates data collected on a roof of a building, the data being analyzed by the receiver system 100 via various methods. The roof of the building may be an environment in which one obstacle exists in an open area.

When a positioning result weight is not applied, the receiver system 100 may obtain an RMSE of 22.1 m horizontally, 22.9 m vertically, and 31.8 m in 3D. Also, when the LW model is applied, the receiver system 100 may obtain an RMSE of 19.5 m horizontally, 18.8 m vertically, and 27.1 m in 3D, and when the TM model is applied, the receiver system 100 may obtain an RMSE of 5.7 m horizontally, 6.2 m vertically, and 8.4 m in 3D. This indicates that, when the LW and TM models are applied, accuracy is improved compared to when a weight is not applied.

Meanwhile, the RA model of the present disclosure shows accuracy improved by 83% horizontally, 84% vertically, and 84% in 3D with an RMSE of 3.7 m horizontally, 3.7 m vertically, and 5.2 m in 3D, wherein the accuracy has a greater improvement rate than 12% horizontally, 18% vertically, and 15% in 3D of the LW model, and 74% horizontally, 73% vertically, and 74% in 3D of the TM model. In other words, the RA model of the present disclosure has an effect of increasing multipath error reducing effectiveness, compared to an existing weighted model.

FIG. 12B illustrates data collected at an urban canyon, the data being analyzed by the receiver system 100 via various methods. The urban canyon may be an urban environment in which multistory buildings and the like are concentrated.

Like FIG. 12A, FIG. 12B illustrates a positioning result for each model in a bar graph. When a positioning result weight is not applied, the receiver system 100 may obtain an RMSE of 38.0 m horizontally, 58.0 m vertically, and 69.3 m in 3D. As a result of applying an existing model, the receiver system 100 may obtain an RMSE of 43.1 m horizontally, 64.8 m vertically, and 77.8 m in 3D for an LW model, and obtain an RMSE of 9.6 m horizontally, 12.7 m vertically, and 16.0 m in 3D for a TM model.

Referring to FIG. 12B, accuracy of the LW model may decrease when a weight is not applied, and the TM model shows an accuracy improvement rate of 75% horizontally, 78% vertically, and 77% in 3D. The RA model of the present disclosure has accuracy improved by 83% horizontally, 88% vertically, and 86% in 3D, compared to when a weight is not applied, with an RMSE of 6.2 m horizontally, 7.1 m vertically, and 9.4 m in 3D. In other words, according to the present disclosure, a high accuracy improvement rate of 80% or greater is achieved even in an urban environment, and the accuracy is improved by 35% horizontally, 44% vertically, and 41% in 3D, even when compared with the existing TM model.

Accordingly, the receiver system 100 of the present disclosure may identify an effect that a reduced multipath error may be observed compared to an existing model even in an environment in which an observation environment is poor, by applying the RA model using a code pseudo-range observation value.

Meanwhile, the above-described methods according to various embodiments of the present disclosure may be implemented in a form of an application installable in an existing electronic device.

In addition, the above-described methods according to various embodiments of the present disclosure may be implemented only by upgrading software or upgrading hardware of an existing electronic device.

Also, various embodiments of the present disclosure described above may be performed via an embedded server provided in an electronic device or an external server of the electronic device.

Meanwhile, according to an embodiment of the present disclosure, the various embodiments described above may be implemented as software including instructions stored in a recording medium readable by a computer or a similar device, by using software, hardware, or a combination thereof. In some cases, the embodiments described herein may be implemented by a processor itself. According to software implementation, embodiments such as procedures and functions described in the present specification may be implemented as separate software modules. Each of the software modules may perform one or more functions and operations described herein.

Meanwhile, the computer or similar device is a device capable of invoking a stored instruction from a storage medium and operating according to the invoked instruction, and may include a device according to the disclosed embodiments. When the instruction is executed by a processor, the processor may perform a function corresponding to the instruction directly or by using other components under control of the processor. The instruction may include code generated or executed by a compiler or interpreter.

The recording medium that can be read by the device may be provided in a form of a non-transitory computer-readable recording medium. The term "non-transitory" only means that a storage medium does not include a signal and is tangible, and does not distinguish whether data is stored in the storage medium semi-permanently or temporarily. In this case, the non-transitory computer-readable recording medium refers to a medium that stores data semi-permanently and is readable by a device, rather than a medium that stores data for a short moment, such as a register, a cache, or a memory. Specific examples of the non-transitory computer-readable recording medium may include compact disc (CD), digital versatile disc (DVD), hard disc, Blue-ray disc, universal serial bus (USB), memory card, and read-only memory (ROM).

In addition, each of components (e.g., modules, programs, devices, etc.) according to the various embodiments described above may include a single or plurality of entities, and some sub-components among the above-described sub-components may omitted, or other sub-components may be further included in various embodiments. Alternatively or additionally, some components (e.g., modules, programs, devices, etc.) may be integrated into one entity, and functions performed by each component prior to the integration may be performed identically or similarly. Operations performed by modules, programs, or other components, according to various embodiments, may be sequentially, parallel, repetitively or heuristically executed, at least some operations may be executed in a different order or omitted, or other operations may be added.

While the exemplary embodiments of the present disclosure have been illustrated and described above, the present disclosure is not limited to the specific embodiments described above, and various modifications may be possible by a person skilled in the art without departing from the gist of the present disclosure claimed in claims. These modifications should not be understood separately from the technical spirit or prospect of the present disclosure.

Therefore, the spirit of the present disclosure should not be determined limitedly based on the above-described embodiments, and not only the appended claims but also all ranges equivalent to or equivalently changed from the claims are within the scope of the spirit of the present disclosure.

The invention claimed is:

1. A data signal processing method of a receiver system for reducing a multipath error of a data signal received from a satellite, the data signal processing method comprising:
   receiving a data signal from at least one satellite and obtaining a pseudo-range of the at least one satellite using the data signal;
   obtaining a range-acceleration based on the pseudo-range;
   applying, to the data signal, a variance obtained by assigning a weight according to a noise model to the range-acceleration; and
   evaluating accuracy based on the data signal to which the weight according to the noise model is applied.

2. The data signal processing method of claim 1, wherein the obtaining of the range-acceleration comprises obtaining, as the range-acceleration, a second time derivative obtained by performing a differentiation on the pseudo-range with respect to time.

3. The data signal processing method of claim 1, wherein the noise model comprises at least one of a linear model, a polynomial model, or an exponential model.

4. A non-transitory computer-readable recording medium storing instructions executable by a computer to perform a data signal processing method of a receiver system for reducing a multipath error of a data signal received from a satellite, the data signal processing method comprising:
   receiving a data signal from at least one satellite and obtaining a pseudo-range of the at least one satellite using the data signal;
   obtaining a range-acceleration based on the pseudo-range;
   applying, to the data signal, a variance obtained by assigning a weight according to a noise model to the range-acceleration; and
   evaluating accuracy based on the data signal to which the weight according to the noise model is applied.

5. The non-transitory computer-readable recording medium of claim 4, wherein the obtaining of the range-acceleration comprises obtaining, as the range-acceleration, a second time derivative obtained by performing a differentiation on the pseudo-range with respect to time.

6. The non-transitory computer-readable recording medium of claim 4, wherein the noise model comprises at least one of a linear model, a polynomial model, or an exponential model.

7. A global navigation satellite system (GNSS) receiver system comprising:
   a data receiver configured to receive a data signal from at least one satellite;
   a pseudo-range obtainer configured to obtain a pseudo-range of the at least one satellite by using the data signal;
   a weight generator configured to obtain a range-acceleration based on the pseudo-range and generate a weight according to a noise model by using the range-acceleration;
   a data processor configured to apply, to the data signal, a variance obtained by assigning the weight to the range-acceleration; and
   an accuracy evaluator configured to evaluate accuracy based on the data signal to which the weight according to the noise model is applied.

8. The GNSS receiver system of claim 7, wherein the weight generator is configured to obtain, as the range-acceleration, a second time derivative obtained by performing a differentiation on the pseudo-range with respect to time.

9. The GNSS receiver system of claim 7, wherein the noise model comprises at least one of a linear model, a polynomial model, or an exponential model.

* * * * *